United States Patent
Boyd et al.

(10) Patent No.: US 9,879,434 B2
(45) Date of Patent: Jan. 30, 2018

(54) FLOORING MODULE

(71) Applicant: QLX Pty Ltd, Footscray, Victoria (AU)

(72) Inventors: Michael David Boyd, Footscray (AU); Mark Gray, Footscray (AU)

(73) Assignee: QLX Pty Ltd, Footscray, Victoria (AU)

( * ) Notice: Subject to any disclaimer, the term of this patent is extended or adjusted under 35 U.S.C. 154(b) by 0 days.

(21) Appl. No.: 15/508,612

(22) PCT Filed: Sep. 4, 2015

(86) PCT No.: PCT/AU2015/050522
§ 371 (c)(1),
(2) Date: Mar. 3, 2017

(87) PCT Pub. No.: WO2016/033656
PCT Pub. Date: Mar. 10, 2016

(65) Prior Publication Data
US 2017/0275892 A1    Sep. 28, 2017

(30) Foreign Application Priority Data

Sep. 4, 2014   (AU) ................................ 2014903538

(51) Int. Cl.
*E04F 15/024*       (2006.01)
*H02G 3/38*         (2006.01)
*H02G 3/22*         (2006.01)

(52) U.S. Cl.
CPC ....... *E04F 15/02411* (2013.01); *H02G 3/385* (2013.01); *E04F 2290/02* (2013.01); *H02G 3/22* (2013.01)

(58) Field of Classification Search
CPC ........... E04F 15/02411; E04F 2290/02; H02G 3/385; H02G 3/22

(Continued)

(56) References Cited

U.S. PATENT DOCUMENTS

| 4,074,488 | A | * | 2/1978 | Ray, III | ............ | E04F 15/02405 |
| | | | | | | 52/126.6 |
| 4,773,196 | A | * | 9/1988 | Yoshida | ............ | E04F 15/02447 |
| | | | | | | 174/486 |

(Continued)

FOREIGN PATENT DOCUMENTS

| JP | H0411854 U | 1/1992 |
| WO | 2011024046 A1 | 3/2011 |

OTHER PUBLICATIONS

International Patent Application No. PCT/AU2015/050522, Search Report and Written Opinion, dated Sep. 18, 2015.

(Continued)

*Primary Examiner* — Brent W Herring
(74) *Attorney, Agent, or Firm* — Kilpatrick Townsend & Stockton LLP; Dean W. Russell; Tiffany L. Williams

(57) ABSTRACT

A flooring module (100) for forming a temporary access floor comprises a base component (1) defining a cruciform channel formation (3, 4) for receiving cabling or the like. The channels (3, 4) have a floor (1A) defined by the base component and a removable channel cover (2). The channel cover (2) comprises one or more channel cover components for covering the channel formation, such that the channel formation and channel cover may combine to provide a closed channel for the cabling or the like. Removal of the cover (2) allows access to the channel formation from above, in use. The sides of the base component (1) define module connector clips (20, 21) for engaging with corresponding module connector clips on adjacent modules to lock the modules together in an array. The base component (1) defines retaining formations (13, 14) for engaging with and retaining the channel cover components over the channel formation. The channel cover (2) engages against one or more of the module connector clips (20, 21) when in the clips are in the closed position so as to limit deflection of the (Continued)

module connector clips (20, 21) and thus prevent disengagement of the module clips from the module clips of an adjacent flooring module in an array of flooring modules. The sides of the module preferably also include a plurality of levelling clips (41, 42) which define upward and downward facing engagement faces to prevent vertical misalignment of the modules.

17 Claims, 9 Drawing Sheets

(58) Field of Classification Search
USPC ........... 52/582.1, 582.2, 584.1, 589.1, 220.2, 52/220.1, 220.3, 220.5, 127.7
See application file for complete search history.

(56) References Cited

U.S. PATENT DOCUMENTS

| | | | | |
|---|---|---|---|---|
| 4,996,804 A * | 3/1991 | Naka | ................ | E04F 15/02452 52/126.1 |
| 4,996,810 A * | 3/1991 | Forde | ................ | E04F 15/02405 52/220.3 |
| 5,031,369 A * | 7/1991 | Kobayashi | ........ | E04F 15/02411 52/126.6 |
| 5,263,289 A | 11/1993 | Boyd | | |
| 5,434,355 A * | 7/1995 | Sho | ................ | H02G 3/28 174/487 |
| 5,440,841 A | 8/1995 | Greenfield | | |
| 5,628,157 A * | 5/1997 | Chen | ................ | E04F 15/02458 52/220.2 |
| 5,630,300 A * | 5/1997 | Chen | ................ | E04F 15/02411 174/488 |
| 5,848,506 A * | 12/1998 | Kobayashi | ........ | E04F 15/02411 52/220.2 |
| 5,904,015 A * | 5/1999 | Chen | ................ | E04F 15/02411 52/220.2 |
| 5,943,833 A * | 8/1999 | Feldpausch | ............ | H02G 3/285 174/53 |
| 6,311,440 B1 * | 11/2001 | Feldpausch | .......... | H02G 3/0493 312/223.2 |
| 6,430,882 B1 * | 8/2002 | Feldpausch | .......... | H02G 3/0493 52/220.1 |
| 6,598,366 B2 * | 7/2003 | Hsieh | ................ | E04F 15/02411 52/220.3 |
| 6,756,539 B1 * | 6/2004 | VanderVelde | .......... | H02G 3/045 138/162 |
| 7,208,676 B2 * | 4/2007 | VanderVelde | .......... | H02G 3/045 138/162 |
| 2003/0084626 A1 * | 5/2003 | Hsieh | ................ | E04F 15/02411 52/220.1 |
| 2007/0017180 A1 * | 1/2007 | Ting | ................ | E04F 15/02411 52/792.11 |
| 2011/0179728 A1 * | 7/2011 | Cerny | .................... | E01C 5/001 52/177 |
| 2013/0167458 A1 * | 7/2013 | Cerny | ............... | E04F 15/02038 52/177 |
| 2016/0237695 A1 * | 8/2016 | Pervan | .............. | E04F 15/02038 |

OTHER PUBLICATIONS

Kingspan Floors, Pedestal access floors, http://www.kingspan.com/our-products/access-floors/access-floor-systems.aspx.

* cited by examiner

FLOORING MODULE

CROSS-REFERENCE TO RELATED APPLICATIONS

This patent application is the U.S. national stage of PCT/AU2015/050522, filed on Sep. 4, 2015, which application claims priority from Australian provisional patent application No 2014903538 filed on Sep. 4, 2014 and entitled "Modular Flooring panel", the entire contents each of which are hereby incorporated by reference.

FIELD OF THE INVENTION

This invention relates to a modular flooring tile suitable for under floor reticulation of cable and other conduit services.

Exhibitions and events typically require the provision of power and communications cabling to most, if not all, points of the floor-space. Accordingly it is becoming common practice to provide a temporary floor which, in addition to providing a platform for the event, incorporates a cavity beneath the deck to allow reticulation of services such as electrical cabling and the like.

Such floors have a number of specific requirements. First, they must be easily and swiftly assembled and dis-assembled. Secondly, they must provide stability without the need to adhere them to the substrate. They must also allow for easy installation, re-configuration and removal of cables, and they should be as low in height as practicable, to minimise steps and ramps and thus maximise useable floor space.

In general, existing access flooring systems are, for one reason or another, poorly suited to such applications.

Deep-void pedestal access floors (see for example http://www.kingspan.com/our-products/access-floors/access-floor-systems.aspx) can provide excellent sub-floor capacity for cabling and other services such as air conditioning and hydraulic lines, but are necessarily higher than optimum, and require adhesion to the sub-floor for stability. They also require specialist tradespeople to install the floors to ensure a level and stable deck.

A range of low-height systems have been developed (for example 'Crosstrack' (U.S. Pat. No. 5,263,289) and various forms of 'OA floor' (Office Automation floor) (eg U.S. Pat. No. 4,773,196, U.S. Pat. No. 5,630,300) but these also present the problem that they require adhesion to the substrate to prevent spreading of the floor.

U.S. Pat. No. 4,996,810 discloses an access floor of a permanent type for use in offices and the like. The "slabs" or modules disclosed in this patent are of the type which define passages for cabling on their underside which means that it is difficult to insert the cabling after the floor has been installed. U.S. Pat. No. 5,440,841 also discloses a pedestal module for a raised floor in which the base is supported from a sub-floor by legs and the cabling passes under the raised floor.

U.S. Pat. No. 4,773,196, discussed above, discloses flooring panels comprising blocks laid on a flexible member which define a cruciform space for laying cables therein. A cruciform cover, in the form of a metal plate, is provided to cover the space. The panels must be glued to the floor to prevent spreading and potential collapse of the cover plates into the cable cavities.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY OF THE INVENTION

In a first broad aspect, the invention provides a modular flooring tile consisting of a load-bearing base component defining two perpendicular services channels, and a load-bearing channel-cover component which is detachable from the base. It is preferred for most applications that the components are manufactured from a resilient polymer such as polypropylene or polyamide. The tile module is designed to interlock with adjoining modules to form a continuous floor sheet providing an array of lateral and longitudinal services channels across the length and breadth of the sheet. Importantly, the detachable cover allows cable to be placed in the module from above.

More particularly, in a first aspect of the present invention, there is provided a flooring module for forming an access floor, typically a temporary floor, comprising:

a base component defining a cruciform channel formation for receiving cabling or the like, the channel formation having a floor defined by the base component;

a removable channel cover comprising one or more channel cover components for covering the channel formation, such that the channel formation and channel cover may combine to provide a closed channel for the cabling or the like, and such that removal of the cover allows access to the channel formation from above, in use;

wherein the sides of the base component define module connector clips for engaging with corresponding module connector clips on adjacent modules to lock the modules together in an array;

wherein said base component defines retaining formations for engaging with and retaining the channel cover components over the channel formation; and wherein the channel cover engages against one or more of said module-clips when in the clips are in the closed position so as to limit deflection of said module clips and thus prevent disengagement of said module clips from the module clips of an adjacent flooring module in an array of flooring modules.

Typically said channel cover defines an end segment at each end of the channel cover which is hinged to a central portion of the channel cover so that when the channel cover is engaged, in use, on the base component, the end segments may rotate away from the base component from a closed position to an open position.

Said end segments, when rotated out of the closed position, may cause displacement of the retaining formations and thus allow disengagement of the channel cover from the base.

When said end segments are rotated out of the closed position in addition to allowing disengagement of the channel cover from the base, they may simultaneously disengage from the module connector clips to allow deflection of said module clips and permit disengagement of the module from adjoining modules in an array.

Typically, each side face of the base component is rotationally symmetrical, so that when assembled into an array abutting module connector clips interlock with each other.

The sides of the base may define horizontally disposed bearing surfaces for engaging with corresponding bearing surfaces on adjacent modules to prevent misalignment of adjoining deck surfaces.

In particular, it is preferred that each outward-facing side wall segment either side of the channel has at least one projection with an upward-facing engagement face and at least one projection with a downward-facing engagement face; wherein said projections are arranged so as to interlock when adjacent modules are joined and prevent vertical misalignment of adjacent modules.

Typically, the base component has a first set of module connector clips that interlock with module connector clips of adjoining modules in an array to restrict relative lateral displacement of the modules, in use, and a second set of module connector clips that inter-engage with module connector clips of adjoining modules to restrict relative vertical movement of the modules, in use.

Preferably, each side face of the base component has a vertically oriented key element and a vertically oriented socket element, disposed such that said key will engage with a corresponding socket on an abutting module, and said socket on the first base will engage with a corresponding key on the second module, to prevent separation of the two modules and to permit limited rotation of the assembly in the horizontal plane, such that the assembly can accommodate to slight undulations in the supporting sub-floor; and when the overlying channel-cover element is in the closed position, blade elements on each side of said channel-cover engage against the clip elements and prevent disengagement of the module from an attached module.

In one embodiment each module has a single cruciform removable channel cover which defines four hinged ends.

Alternatively, each module may include a first elongate channel cover which defines two hinged ends which covers one channel extending from one side of the module to an opposite side and two hinged channel covers each extending from the first elongate channel cover to another side of the module Each channel cover has an upper portion and one or more depending elements/side rails which locate behind the walls of the channel formation.

Typically, each channel cover defines a recess either side of the hinge which when the cover is engaged in the base component in use form a continuous recess, into which retaining formations of the base component locate.

It is preferred that the base component is square in plan view and is rotationally symmetrical.

Pads may be defined at corners of the base module which are infilled or overlaid with a structural cover plate.

In one variant the channel cover is formed from a metal such as steel.

A plurality of modules may be assembled into a rectangular array.

The invention also encompasses a rectangular array of flooring modules including at least one removable channel cover strip incorporating a plurality of linked segments covering the channels of multiple modules.

The base component is typically square in plan and is rotationally symmetrical, so that the module may be orientated in any direction. It typically has three sets of clips to facilitate assembly into a flooring array: cover-clips that secure the channel covers in place, connecting clips that attach the modules together, and levelling clips which prevent vertical displacement of adjoining tiles.

A preferred module size is 250 mm×250 mm or 10 in.×10 in., and a second preferred size is 200 mm×200 mm or 8 in.×8 in., however other sizes may be advantageous in certain applications. The preferred minimum height of the base is about 30 mm or 1.2 in.

In some applications a deeper profile will be advantageous but at lower heights the services channels may be too shallow to accommodate larger wires and conduits.

The channels may be any width however a preferred dimension is about 50 mm or 2 in.—narrower channels will lack capacity and wider spans will require deeper channel-cover sections which will reduce channel depth and/or add to module height, and add to cost.

The channel-cover may be a unitary moulding or may consist of discrete components. It serves two functions: firstly it provides a load-bearing enclosure to the services channels, and secondly it acts as a locking mechanism that prevents the connecting clips disengaging from the adjoining tiles.

Advantageously, the flooring module is rotationally symmetrical and incorporates both levelling and connecting means and can be pre-assembled into a transportable sheet, and dis-assembled as or if required Modules may be pre-assembled during manufacture to form panels conveniently sized for shipping, and these panels may then be linked together on site to form a sheet covering the entire floor. Preferred panel sizes would be 4 modules long×4 modules wide, or say 3 modules long×3 modules wide if the product must be transported through narrow doorways or corridors.

Advantageously the connecting clips are robust enough to prevent pre-assembled sheets from falling apart

BRIEF DESCRIPTION OF THE DRAWINGS

Specific embodiments of the present invention will now be described, by way of example only, and with reference to the accompanying drawings, in which:—

DETAILED DESCRIPTION OF PREFERRED EMBODIMENTS

Figure 1:
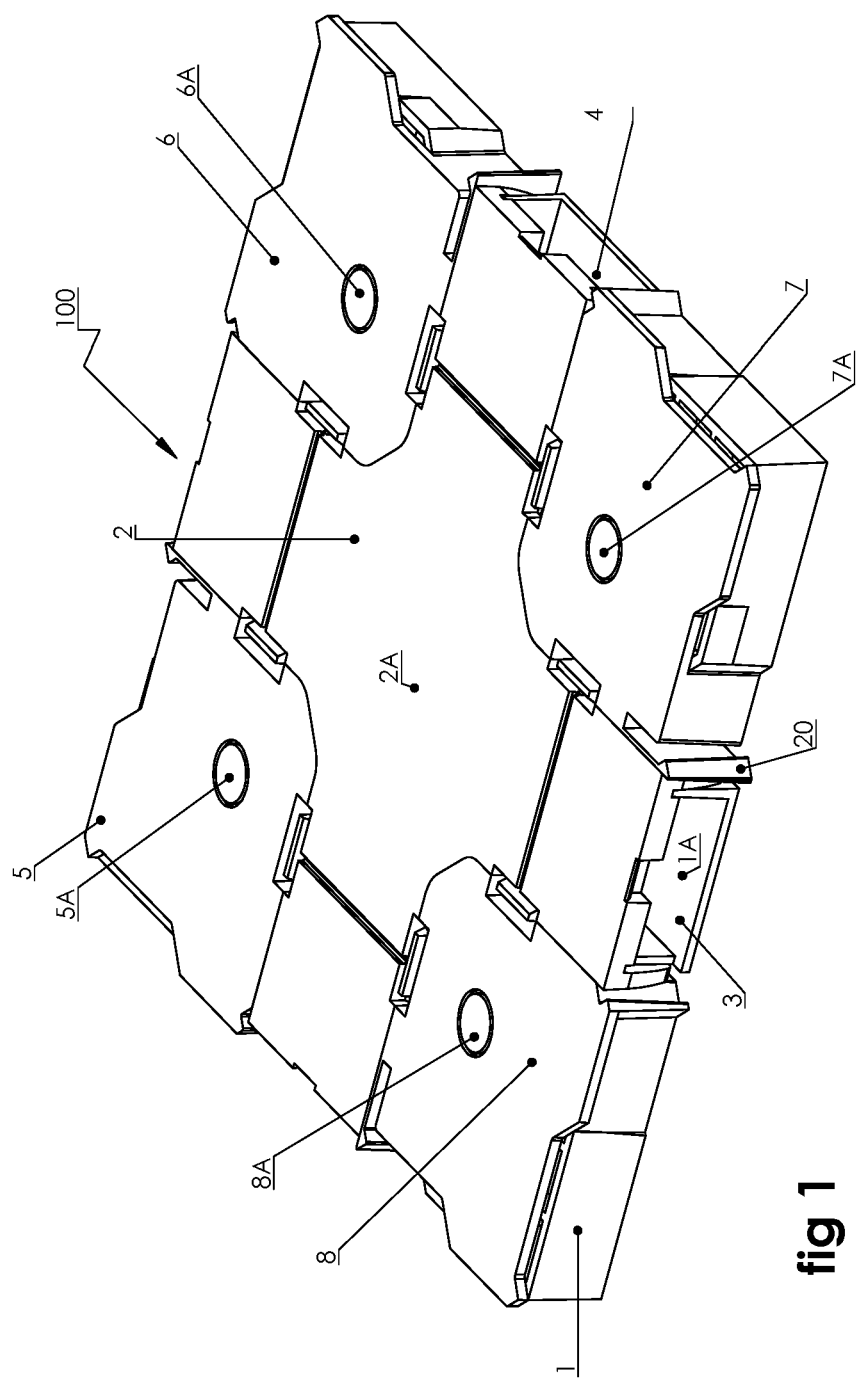
FIG. 1 is an isometric view of an assembled tile module in which the channel-cover is a unitary moulding with integrally-hinged end sections.
Figure 2:
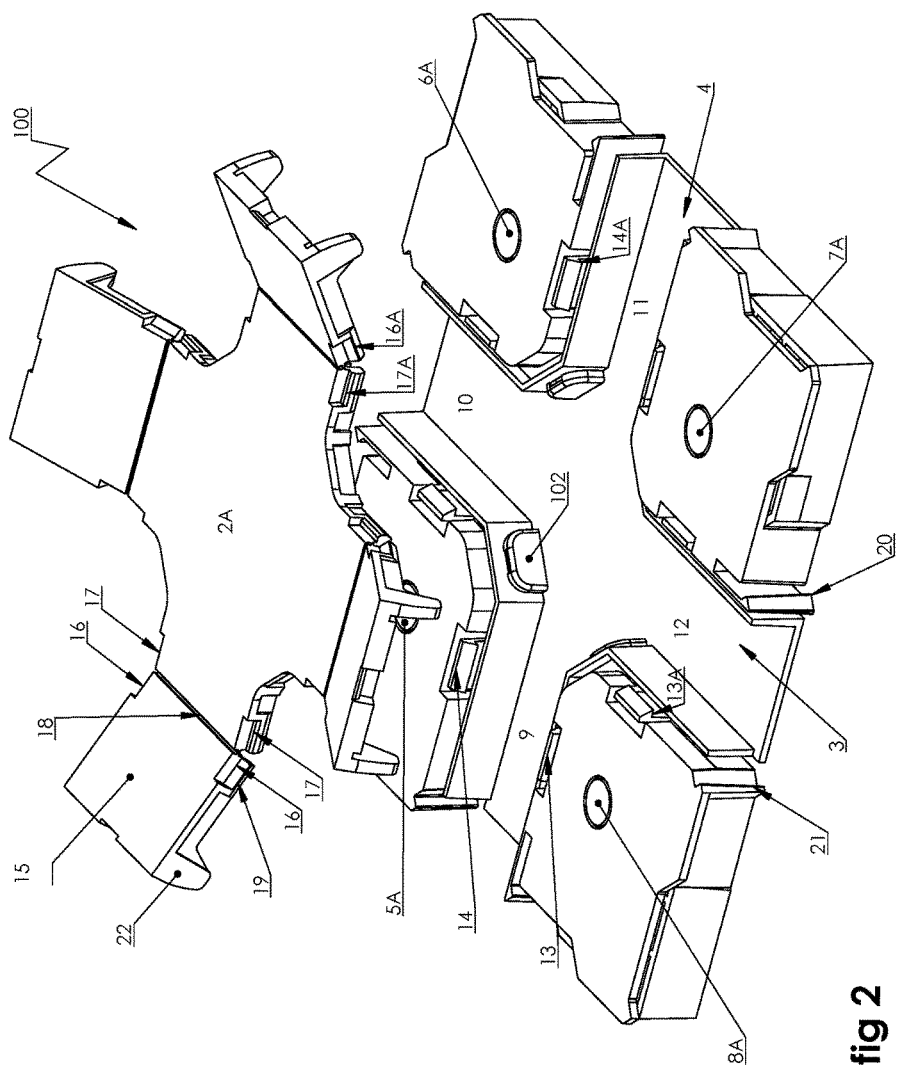
FIG. 2 is an exploded view of the tile module shown in FIG. 1, in which the channel-cover end sections are rotated upwards.

FIGS. 1 and 2 depict a tile in the form of a flooring module 100 including a base 1 and a unitary channel cover 2. The base is typically injection moulded in a plastics material. Although the actual dimensions of the module are not critical, in the embodiment shown, the module is approximately 250 mm by 250 mm.

The base 1 includes a base plate or planar floor 1A on which a laterally extending services channel 3 and a longitudinal services channel 4 are defined which are bounded by load-bearing corner pads 5, 6, 7, 8 to form four channel segments 9, 10, 11, 12. Each channel segment has a pair of retaining formations in the form of cover clips 13, 14 located alongside the channel side-walls. As is best seen in FIG. 2, the channels 3 and 4 intersect at right angles and combine to form a cruciform channel formation.

In the embodiment shown in FIGS. 1 and 2, the channel cover 2 is a unitary moulding with four rotatable end-segments 15. Recesses or clip sockets 16, 17 extend across the hinge axes 18. The pairs 16 and 17 together form a single continuous recess in use, when the end segments are in the closed position as shown in FIG. 1. The retaining formations in the form of cover clips 13 and 14 locate in and above the recess 16 and 17 inhibiting removal of the channel cover.

The cover clips 13, 14 act to retain or hold down the cover to the base 1. They have horizontal bearing faces 13A, 14A on their undersides which engage against bearing faces 16A, 17A on the clip sockets 16, 17 which prevent vertical displacement of the channel cover. One bearing face 17A is oriented generally horizontal in use as is best seen in FIG. 2. The other bearing face is oriented generally at an angle of about 45° to the horizontal in use, again as is best seen in FIG. 2 The outer engaging face 19 of each clip socket however slopes downward, so that when the end-segment is rotated upwards and out of the channel the engaging face wipes against the cover clips 13, 14 and displaces them out of engagement with sockets 16, 17. When all four end-segments have been rotated up and all four sets of cover clips 13, 14 have been thus displaced the channel cover 2 may be removed from the base.

Also shown in FIG. 2 is an optional removable "break out" portion 102 which can be removed to allow cabling to pass through to under the corner pads. Each corner pad 5, 6, 7, 8 also has an optional break out 5A, 6A, 7A, 8A that allows cabling to exit from the respective corner pad, where it may, for example, terminate in a surface mounted floor socket.

Figure 3:
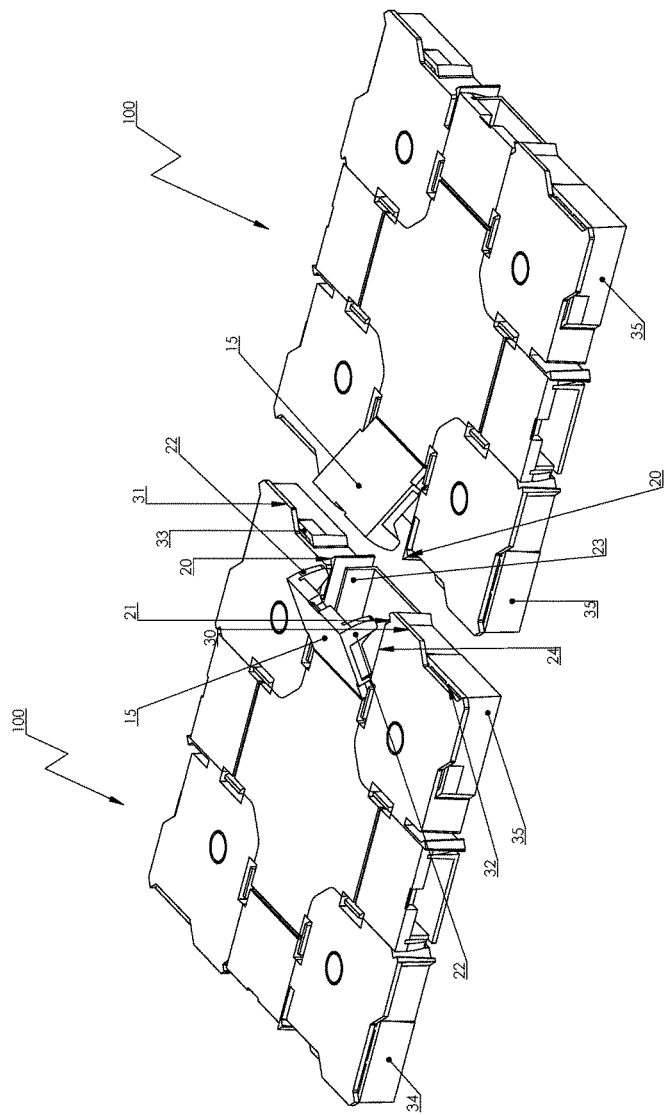
FIG. 3 shows two modules positioned so that they may be linked together.
Figure 4:
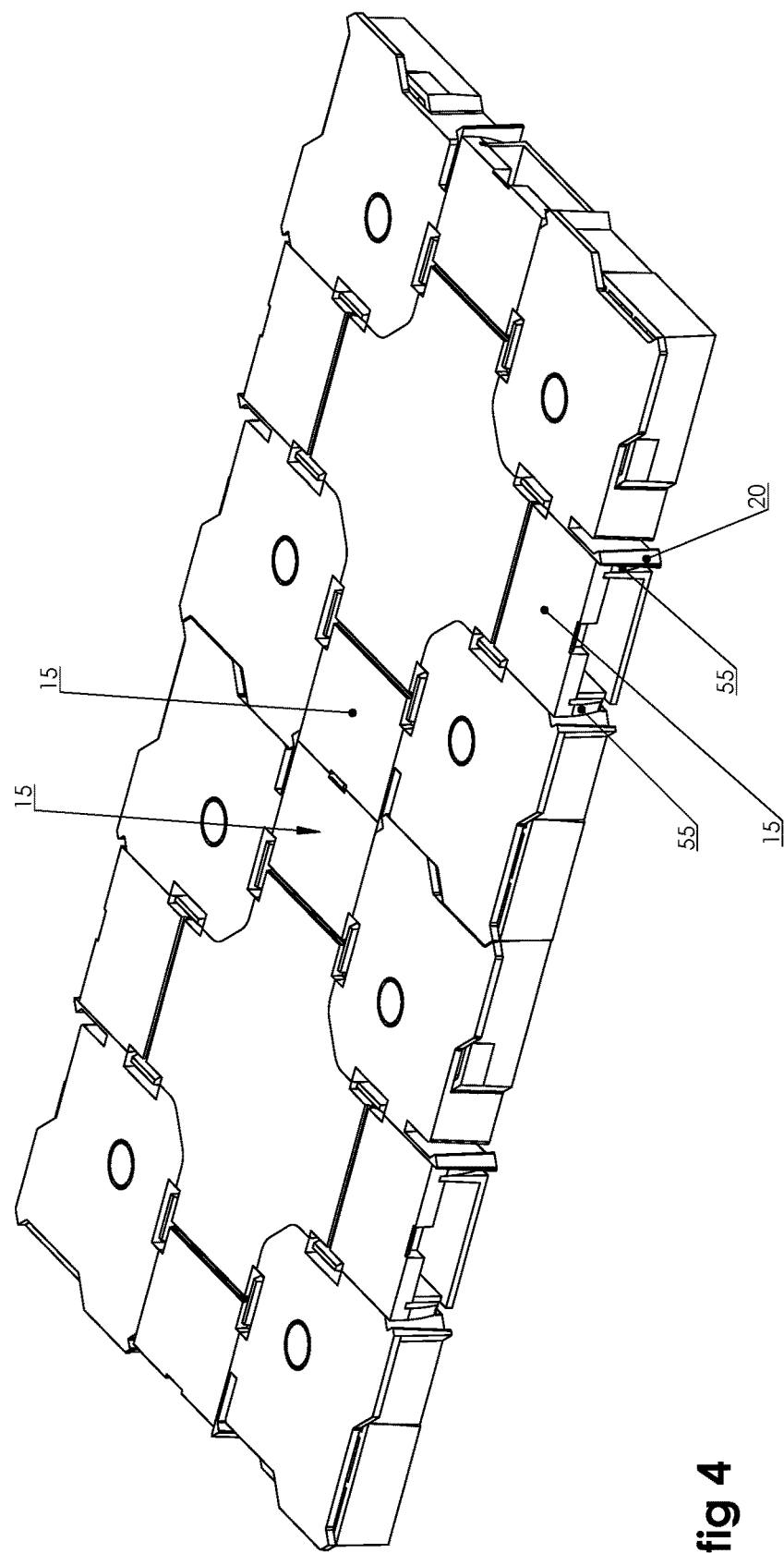
FIG. 4 shows the two modules of FIG. 3 linked together.

The base has four pairs of connecting clips 20, 21. One pair 20, 21 is defined at the end of each channel segment. Each pair comprises a key 20 and, on the opposite side of the channel, a corresponding socket 21 for receiving a key of an adjacent module. As depicted in FIGS. 3 and 4, when two tile modules are brought together the key 20 on each tile engages into the corresponding socket 21 on the adjoining tile.

This feature may allow a plurality of modules 100 to be assembled together in an array of modules perhaps 1 meter by one meter for ease of transport and laying.

After the two tiles have been brought together and the clips are fully engaged, the channel-cover end-segments 15 may be rotated into the closed position, at which point extensions 22 on the end segments engage between connecting clip keys 20 and channel side walls 23, 24, thus holding the keys 20 into the opposing sockets 21 and substantially preventing the tiles from accidentally disengaging.

This feature increases the reliability of the connecting clips 20, 21 and enhances the ability of the modules to be assembled and transported in larger arrays.

In addition to the connecting clips, the base 1 has a set of levelling clips on each side. As shown in FIG. 3, tongues 30, 31 on each side engage over corresponding sockets 32, 33 and thus prevent vertical misalignment of adjoining tiles.

If the components of the tile module are injection-moulded, the side faces of the base 1 will be drafted away from the vertical to allow ejection of the base 1 from the moulding die. In the example shown in FIGS. 1 to 4, the side-wall drafts of the base 1 are arranged so that when two tiles adjoin, the abutting faces make contact over the full height of the tiles. For example, as shown on FIG. 3, face 34 is drafted inwards from the bottom whereas the corresponding face 35 is drafted outwards from the bottom. Likewise keys 20 are drafted inwards from the bottom whereas sockets 21 are drafted outwards from the bottom. The effect of this is to ensure that adjoining tiles are rigidly interconnected and the resulting tile sheet will have relatively limited flexibility.

Figure 5:
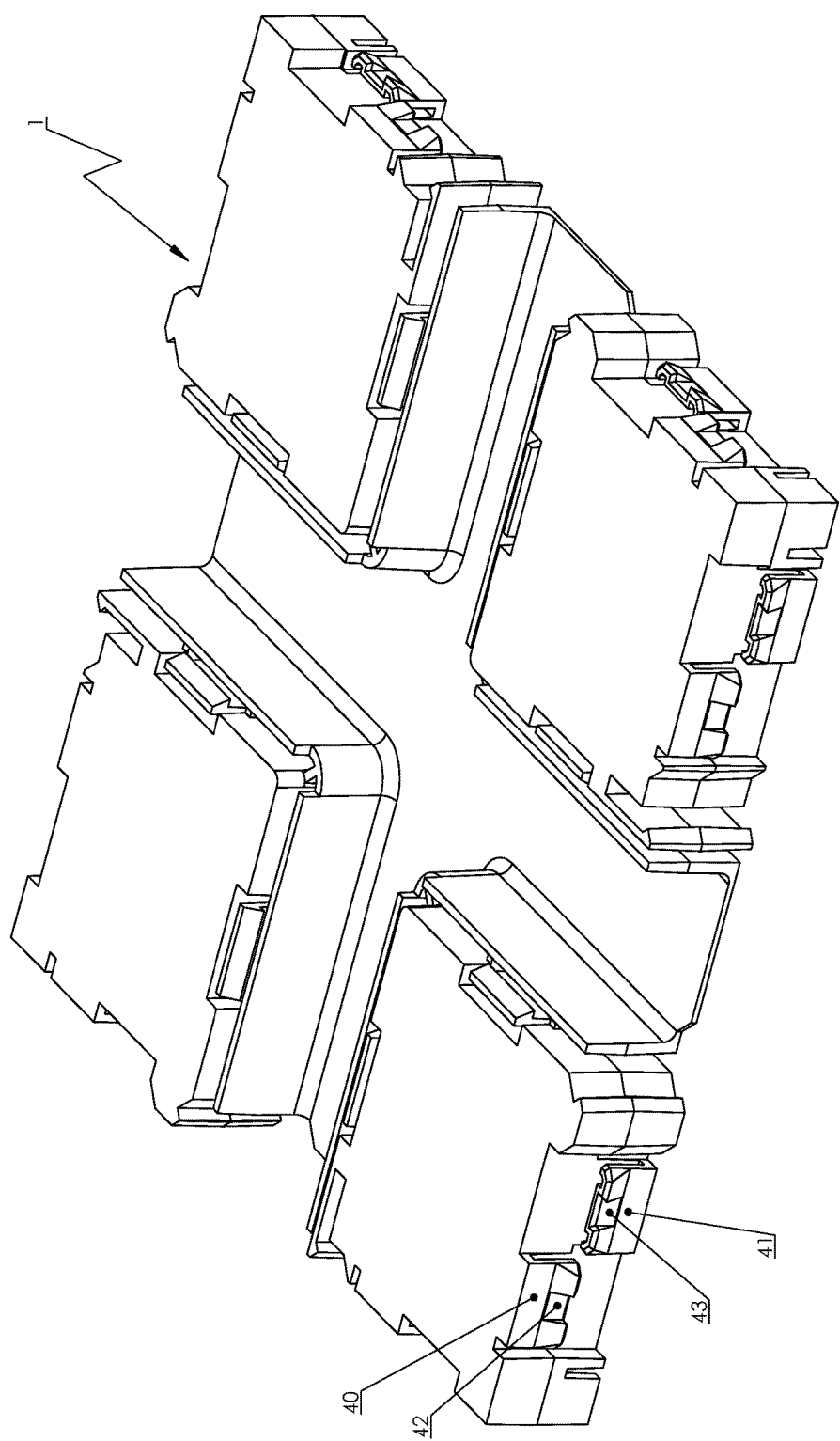
FIG. 5 shows an alternative embodiment in which the base incorporates mid-height levelling-clips.
Figure 6:
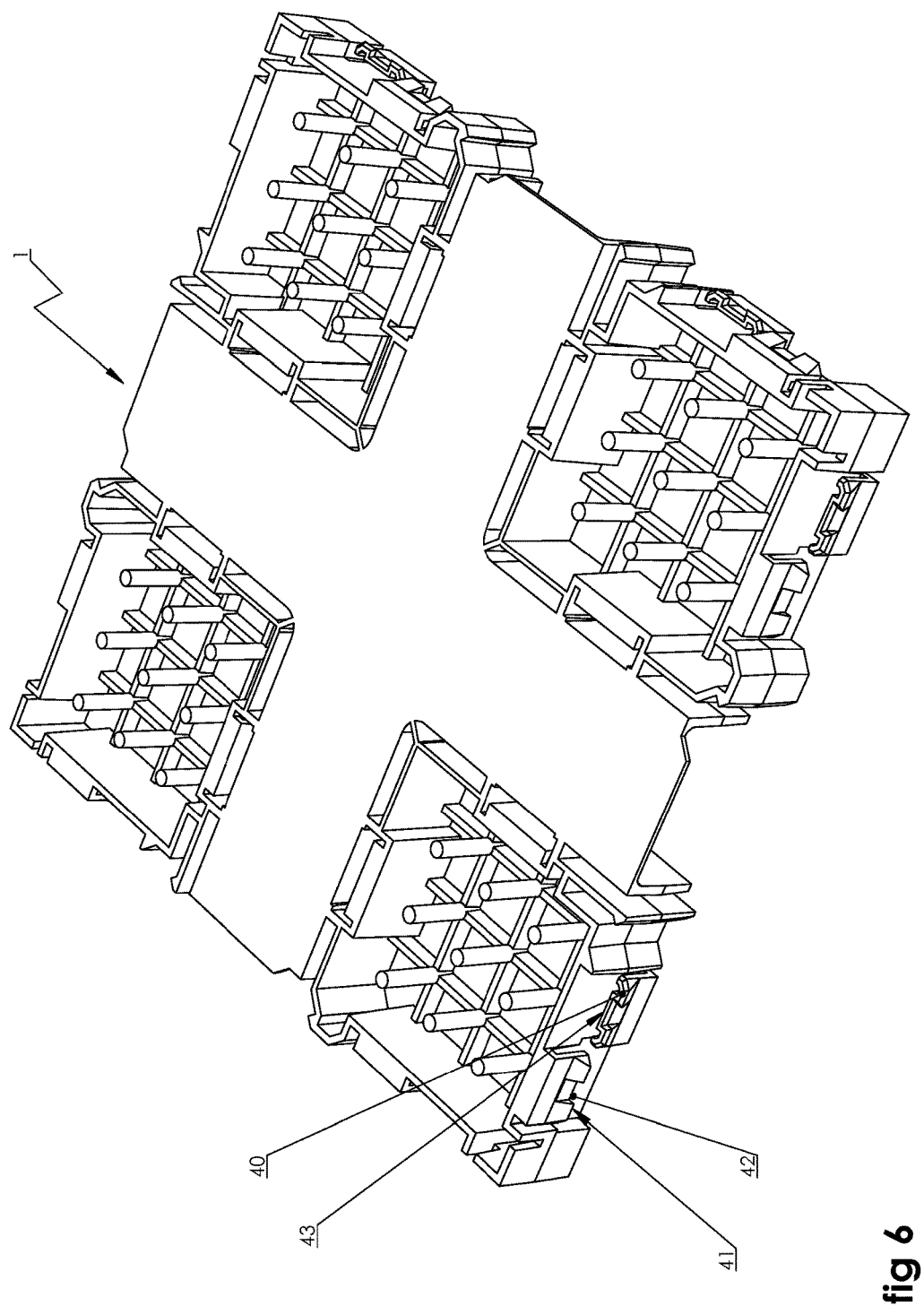
FIG. 6 is an underside view of the base shown in FIG. 5.

In some circumstances it may be desirable that the tile connections allow a degree of rotation between panels, for instance if the tile sheet is to be laid over an undulating sub-floor. One means by which this can be accomplished is shown in FIGS. 5 and 6, in which all external side walls are drafted inward from a mid-level parting line.

Each side-wall segment has a pair of opposing levelling clips 40, 41 that lie on opposite sides of the mid-plane and engage with a corresponding levelling clip on the adjoining tile to ensure horizontal alignment between adjoining tiles. Additionally the clips 40, 41 are provided with recessed slots 42, 43, the purpose of which is to allow a tool such as a screwdriver to be inserted and thereby disengage the upper clips from the lower clips and allow the tile to be removed from the interior of the sheet.

In applications such as floors in temporary exhibitions and sporting events it is important to have speed of access to cable pathways, as well as speed of erection and disassembly of the floor. To facilitate this, in one embodiment, the channel covers may be provided in the form of articulated strips of discrete components, as illustrated in FIGS. 7 to 12.

Figure 7:
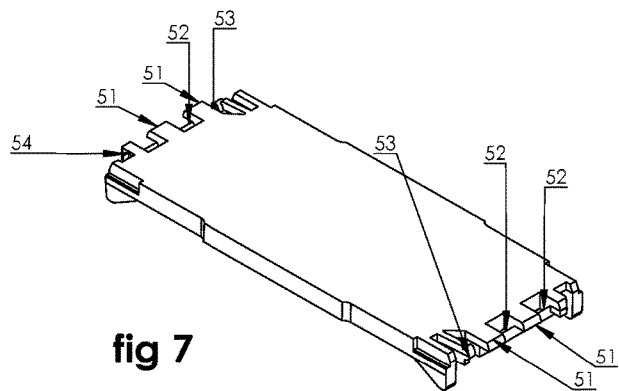
FIG. 7 is an isometric view of a central channel-cover segment that forms part of a composite channel cover assembly.
Figure 8:
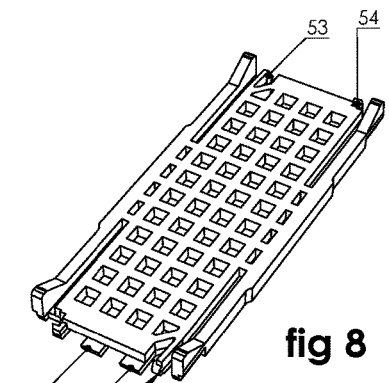
FIG. 8 is an underside view of the central cover-plate shown in FIG. 7.
Figure 9:
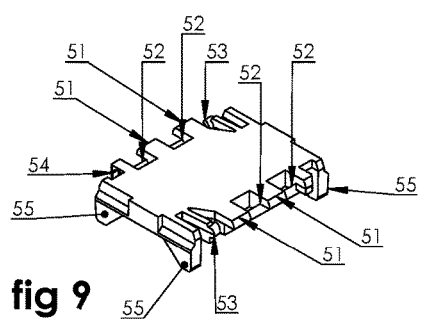
FIG. 9 shows a connector-plate that links a series of channel-cover segments to form a long channel cover strip.
Figure 10:
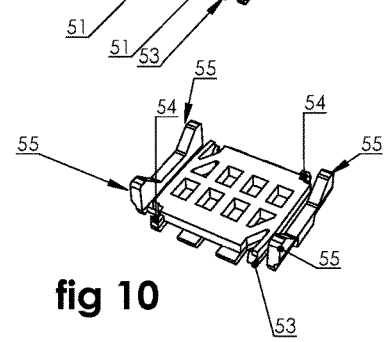
FIG. 10 is an underside view of the connector-plate shown in FIG. 9.
Figure 11:
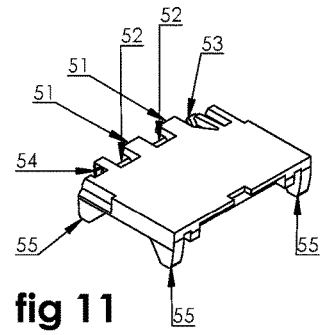
FIG. 11 shows an end-plate that terminates a cover strip and which serves as an access point for disengaging the strip from the base array and removing the strip from the channel.
Figure 12:
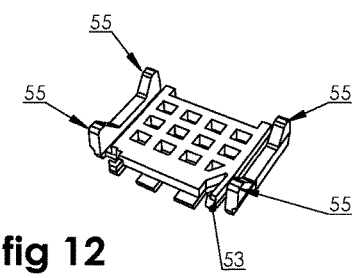
FIG. 12 is an underside view of the end-plate.

FIGS. 7 and 8 show a central channel cover segment that fits across the intersection of the services channels. FIGS. 9 and 10 show a connecting segment, and FIGS. 11 and 12 show an end segment. Each of these components has a pair or pairs of fingers 51 and adjacent recesses 52 that engage with corresponding fingers and recesses on adjoining components to form load bearing rotatable connections between components.

The engaging ends of the channel cover components are also provided with retaining catches 53 that engage into sockets 54. The resulting assemblies allow relative rotation of the components to an angle determined by the depth of the recesses 52. In models shown in FIGS. 7 to 12, the angle is about 45 degrees.

As with the unitary cover-plate, the connector plate and the end plate components have depending elements in the form of side rail extensions 55 that in the closed position act as keepers that prevent the tile connecting clips 20, 21 from disengaging. This can also be seen with reference to FIG. 4 which show the keepers 55 locate between the wall of the channel in a gap between the channel wall and the corner pad/tile connecting clip 20 which is use prevents the clip 20 from moving away from and disengaging from a corresponding clip 21 (not shown) when engaged with such a clip 21.

Figure 13:
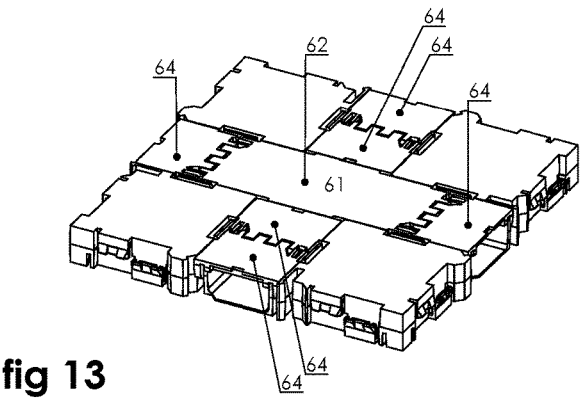
FIG. 13 is a view of a tile module with a composite channel-cover.

FIG. 13 shows a flooring module fitted with cover strips fabricated from the above components. In this example, the channel cover assembly comprises a longitudinal cover-strip 61 fabricated from one central cover-plate and two end-plates, and two lateral cover-strips each fabricated from two end-plates.

Figure 14:
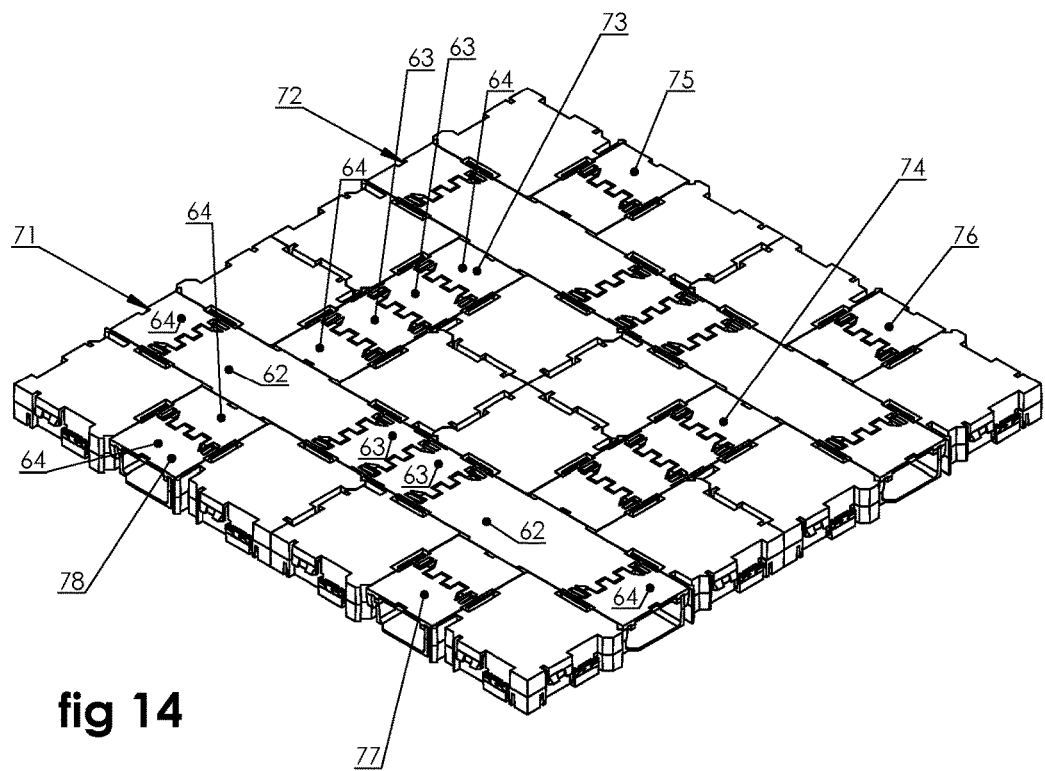
FIG. 14 shows a panel of four pre-assembled tile modules in which the channel-covers include composite strips running the length of the panel.

FIG. 14 shows a panel comprising an array of four tile bases, which has two full-length cover strips. In this example cover strips 71, 72 comprise two central cover-plates 62, two connector plates 63 and two end-plates 64. There are two lateral strips 73, 74 each comprising two connector-plates 63 and two end-plates 64, and there are four lateral end-strips 75, 76, 77, 78 each comprising two end-plates 64.

Figure 15:
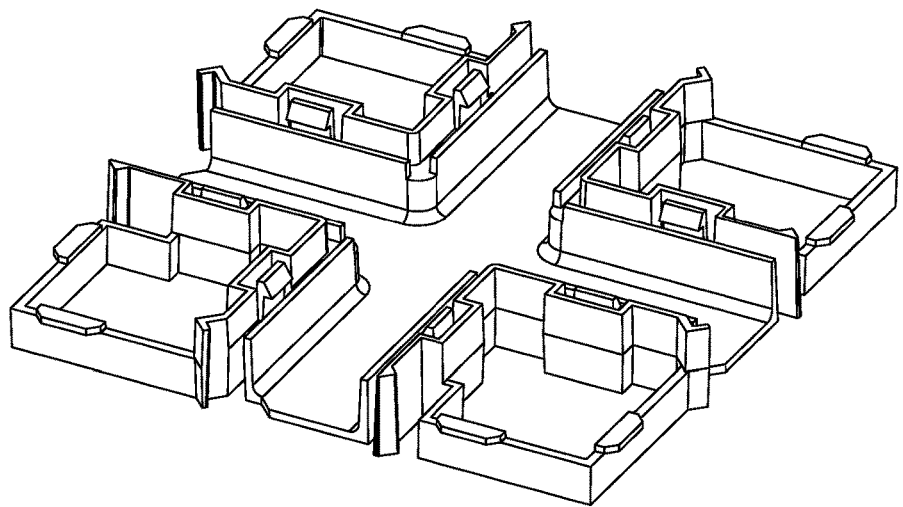
FIG. 15 shows an alternative base which is open at the corners.

FIG. 15 shows a base component 200 with the same arrangement of lateral and longitudinal channels, cover clips and connecting clips as in the previous examples of base components, but without the corner pads. This configuration will allow a variety of alternative infills to the interstitial spaces around the conduit grid, such as in-situ concrete screed or medium density chipboard. Such materials have the potential to improve stability in a permanent installation and/or reduce cost of the installation.

Figure 16:
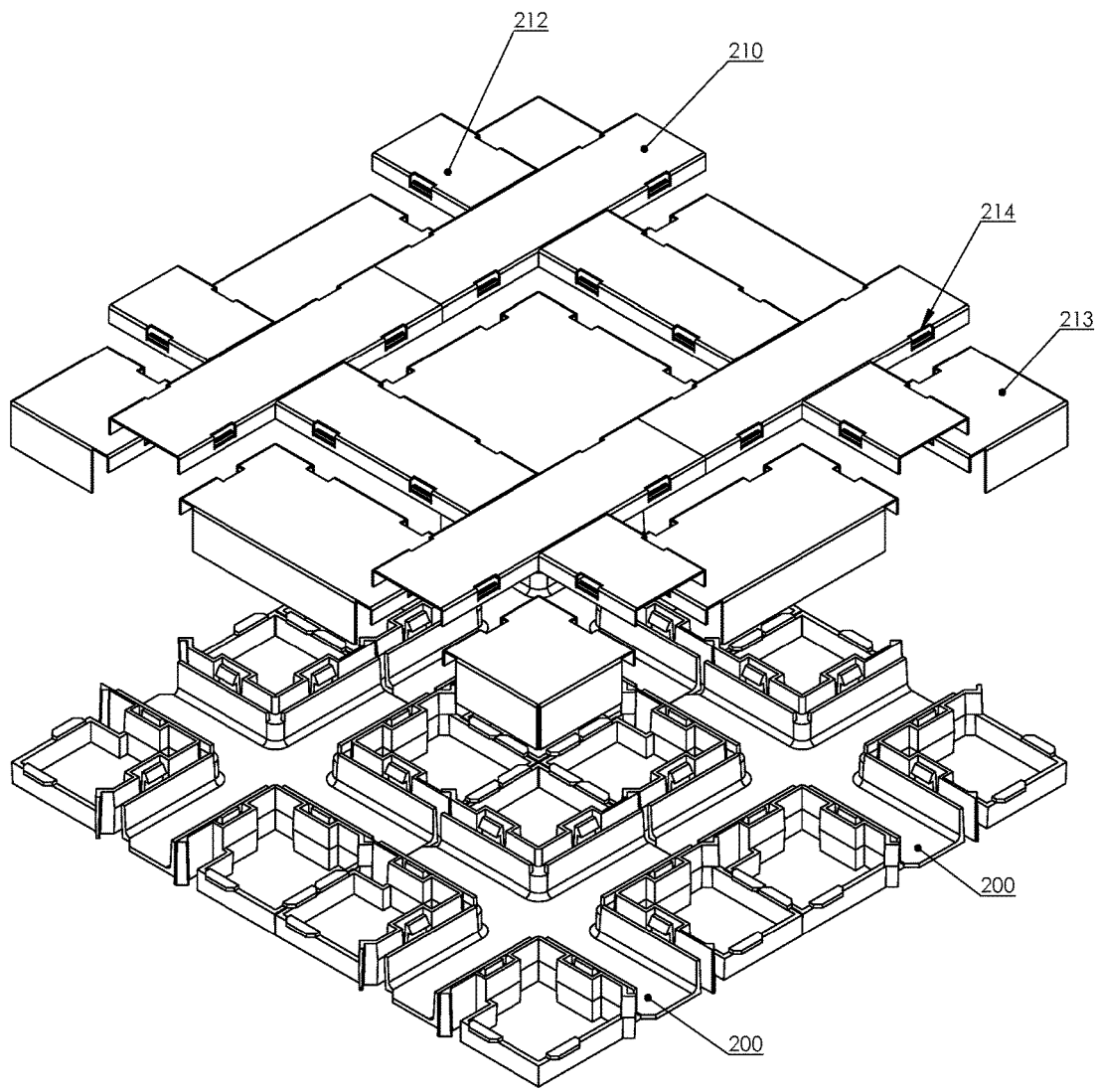
FIG. 16 is an exploded view showing an array of bases as shown in FIG. 15 with steel cover plates.

FIG. 16 shows an array of base components 200 with covers 210, 212 formed from folded steel plate. There are longer covers 210 and shorter covers 212. There are also steel cover plates 213 which cover the corners of the base components. The covers include recesses 214 which receive the "hold down" or cover clips 13, 14 to retain the covers 210, 212 in place. In this case the cover plates do not have hinged end portions so the cover clips 13, 14 would have to be displaced e.g. using a screwdriver blade for removal of the cover so would not be as easy to remove as the previous embodiments. The floor would have a greater load bearing capacity.

In some embodiments, the base component may be used with a steel plate (not shown) or the like as a cover instead of the moulded plastic covers.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The claims defining the invention are as follows:

1. A flooring module for forming an access floor comprising:
    a base component defining a cruciform channel formation for receiving cabling or the like, the channel formation having a floor defined by the base component;
    a removable channel cover comprising one or more channel cover components for covering the channel formation, such that the channel formation and channel cover may combine to provide a closed channel for the cabling or the like, and such that removal of the cover allows access to the channel formation from above, in use;
    wherein the sides of the base component define module connector clips for engaging with corresponding module connector clips on adjacent modules to lock the modules together in an array;
    wherein said base component defines retaining formations for engaging with and retaining the channel cover components over the channel formation; and
    wherein when the channel cover is engaged with the base component, the channel cover engages against one or more of said module connector clips when the module connector clips are in the closed position so as to limit deflection of said module connector clips and thus prevent disengagement of said module connector clips from the module clips of an adjacent flooring module in an array of flooring modules.

2. A flooring module as claimed in claim 1 wherein said channel cover defines an end segment at each end of the channel cover which is hinged to a central portion of the channel cover so that when the channel cover is engaged, in use, on the base component, the end segments may rotate away from the base component from a closed position to an open position.

3. A flooring module as claimed in claim 2 wherein said end segments, when rotated out of the closed position, will cause displacement of the retaining formations and thus allow disengagement of the channel cover from the base.

4. A flooring module as claimed in claim 3 wherein when said end segments are rotated out of the closed position in addition to allowing disengagement of the channel cover from the base, they simultaneously disengage from the said module connector clips to allow deflection of said module clips and permit disengagement of the module from adjoining modules in an array.

5. A flooring module as claimed in claim 2 wherein each channel cover defines a recess either side of the hinge which when the cover is engaged in the base component in use form a continuous recess, into which retaining formations of the base component locate.

6. A flooring module as claimed in claim 1 in which each side face of the base component is rotationally symmetrical, so that when assembled into an array abutting module connector clips interlock with each other.

7. A flooring module as claimed in claim 1 wherein each outward-facing side wall segment either side of the channel has at least one projection with an upward-facing engagement face and at least one projection with a downward-facing engagement face; wherein
    said projections are arranged so as to interlock when adjacent modules are joined and prevent vertical misalignment of adjacent modules.

8. A flooring module as claimed in claim 1 in which the base component has a first set of module connector clips that interlock with module connector clips of adjoining modules in an array to restrict relative lateral displacement of the modules, in use, and a second set of module connector clips that inter-engage with module connector clips of adjoining modules to restrict relative vertical movement of the modules, in use.

9. A flooring module as claimed in claim 1 wherein each side face of the base component has a vertically oriented key element and a vertically oriented socket element, disposed such that said key will engage with a corresponding socket on an abutting module, and said socket on the first base will engage with a corresponding key on the second module, to prevent separation of the two modules and to permit limited rotation of the assembly in the horizontal plane, such that the assembly can accommodate to slight undulations in the supporting sub-floor; and when the overlying channel-cover element is in the closed position, blade elements on each side of said channel-cover engage against the clip elements and prevent disengagement of the module from an attached module.

10. A flooring module as claimed in claim 1 wherein each module has a single cruciform removable channel cover which defines four hinged ends.

11. A flooring module as claimed in claim 1 wherein each module includes a first elongate channel cover which defines two hinged ends which covers one channel extending from one side of the module to an opposite side and two hinged channel covers each extending from the first elongate channel cover to another side of the module.

12. A flooring module as claimed in claim 1 wherein each channel cover has an upper portion and one or more depending elements/side rails which locate behind the walls of the channel formation.

13. A flooring module as claimed in claim 1 wherein the base component is square in plan and is rotationally symmetrical.

14. A flooring module as claimed in claim 1 wherein pads are defined at corners of the base module which are infilled or overlaid with a structural cover plate.

15. A flooring module as claimed in claim 1 wherein the channel cover is formed from a metal such as steel.

16. A plurality of modules as claimed in claim 1 assembled into a rectangular array.

17. A rectangular array of flooring modules as claimed in claim 1 including at least one removable channel cover strip incorporating a plurality of linked segments covering the channels of multiple modules.

* * * * *